United States Patent
Chandan et al.

(10) Patent No.: US 10,884,769 B2
(45) Date of Patent: Jan. 5, 2021

(54) PHOTO-EDITING APPLICATION RECOMMENDATIONS

(71) Applicant: Adobe Inc., San Jose, CA (US)

(72) Inventors: Chandan, Bengaluru (IN); Srikrishna Sivesh Guttula, Visakhapatnam (IN); Reetesh Mukul, Bengaluru (IN)

(73) Assignee: Adobe Inc., San Jose, CA (US)

(*) Notice: Subject to any disclaimer, the term of this patent is extended or adjusted under 35 U.S.C. 154(b) by 281 days.

(21) Appl. No.: 15/898,456

(22) Filed: Feb. 17, 2018

(65) Prior Publication Data

US 2019/0258498 A1 Aug. 22, 2019

(51) Int. Cl.
| | |
|---|---|
| *G06F 3/048* | (2013.01) |
| *G06F 9/451* | (2018.01) |
| *G06N 3/02* | (2006.01) |
| *G06T 11/60* | (2006.01) |
| *G06F 40/20* | (2020.01) |

(52) U.S. Cl.
CPC .............. *G06F 9/453* (2018.02); *G06F 40/20* (2020.01); *G06N 3/02* (2013.01); *G06T 11/60* (2013.01)

(58) Field of Classification Search
CPC ....... G06F 3/0481–0489; G06F 40/166; G06F 40/106; G06F 16/9577; G06F 3/04847; G06F 3/04845; G06F 3/0488; G06F 3/04883; G06F 40/169; G06F 40/20
See application file for complete search history.

(56) References Cited

U.S. PATENT DOCUMENTS

| | | | | |
|---|---|---|---|---|
| 5,684,999 A | * | 11/1997 | Okamoto | G06F 16/58 704/9 |
| 5,867,163 A | * | 2/1999 | Kurtenbach | G06F 8/34 715/840 |
| 6,046,741 A | * | 4/2000 | Hochmuth | G06F 3/023 712/215 |

(Continued)

OTHER PUBLICATIONS

"Advisory Action", U.S. Appl. No. 14/751,449, dated Oct. 29, 2018, 2 pages.

(Continued)

*Primary Examiner* — Steven B Theriault
(74) *Attorney, Agent, or Firm* — SBMC

(57) ABSTRACT

Photo-editing application recommendations are described. A language modeling system generates a photo-editing language model based on application usage data collected from existing users of a photo-editing application. The language modeling system generates the model by applying natural language processing to words that are selected to represent photo-editing actions described by the application usage data. The natural language processing involves partitioning contiguous sequences of the words into sentences of the modeled photo-editing language and partitioning contiguous sequences of the sentences into paragraphs of the modeled photo-editing language. The language modeling system deploys the photo-editing language model for incorporation with the photo-editing application. The photo-editing application uses the model to determine a current workflow in real-time as input is received to edit digital photographs, and recommends tools for carrying out the current workflow.

20 Claims, 7 Drawing Sheets

(56) References Cited

U.S. PATENT DOCUMENTS

| | | | |
|---|---|---|---|
| 6,230,204 B1* | 5/2001 | Fleming, III | G06F 11/3414 709/224 |
| 6,590,584 B1* | 7/2003 | Yamaura | G06F 3/0481 715/704 |
| 6,622,119 B1* | 9/2003 | Ramaswamy | G06F 40/274 704/9 |
| 6,690,392 B1* | 2/2004 | Wugoski | G06F 3/0481 715/704 |
| 6,757,027 B1* | 6/2004 | Edwards | H04N 5/262 348/701 |
| 6,912,692 B1* | 6/2005 | Pappas | G06F 9/45512 715/762 |
| 6,963,360 B1* | 11/2005 | Esquibel | H04N 5/232 348/207.99 |
| 7,349,845 B2* | 3/2008 | Coffman | G06F 40/44 704/257 |
| 7,676,145 B2* | 3/2010 | Kuberka | G03B 17/18 396/263 |
| 7,739,666 B2* | 6/2010 | Zhu | G06F 11/321 714/38.14 |
| 7,953,690 B2* | 5/2011 | Luo | G06N 5/003 706/47 |
| 7,986,298 B1* | 7/2011 | Dulaney | G06T 11/60 345/156 |
| 8,176,437 B1* | 5/2012 | Taubman | G06F 9/44578 715/757 |
| 8,352,433 B2 | 1/2013 | Crescenti et al. | |
| 8,418,061 B2* | 4/2013 | Kintzley | G06F 9/45512 715/700 |
| 8,487,955 B2* | 7/2013 | Bala | G06T 11/001 345/156 |
| 8,510,328 B1* | 8/2013 | Hatton | G06F 40/247 707/769 |
| 8,514,315 B2* | 8/2013 | Lee, II | H04N 5/23219 348/222.1 |
| 8,627,230 B2* | 1/2014 | Boehler | G06F 9/453 715/811 |
| 8,751,491 B2* | 6/2014 | Fitzmaurice | G06F 3/0237 707/727 |
| 8,913,827 B1* | 12/2014 | Fang | G06T 11/001 382/162 |
| 8,943,051 B2 | 1/2015 | Fan et al. | |
| 9,026,941 B1* | 5/2015 | Krueger | G06F 16/00 715/812 |
| 9,141,335 B2* | 9/2015 | Wilensky | G06F 16/5866 |
| 9,262,213 B1* | 2/2016 | Gralhoz | G06F 8/38 |
| 9,323,996 B2* | 4/2016 | Johnson | G06K 9/033 |
| 9,367,526 B1* | 6/2016 | Vozila | G06F 40/117 |
| 9,436,382 B2* | 9/2016 | Wilensky | G06F 3/0488 |
| 9,436,760 B1 | 9/2016 | Tacchi et al. | |
| 9,519,401 B2* | 12/2016 | Antipa | G06F 3/0482 |
| 9,558,278 B2* | 1/2017 | Bachman | G06F 3/0484 |
| 9,558,428 B1* | 1/2017 | Green | G06K 9/00677 |
| 9,626,159 B2* | 4/2017 | Mahmud | G06F 8/30 |
| 9,652,109 B2* | 5/2017 | Borzello | G06F 3/0482 |
| 9,824,684 B2* | 11/2017 | Yu | G10L 15/16 |
| 9,836,484 B1* | 12/2017 | Bialynicka-Birula | G06F 16/51 |
| 9,986,080 B2* | 5/2018 | Velusamy | G06F 3/0619 |
| 10,007,550 B2* | 6/2018 | Gehin | G06Q 10/0633 |
| 10,019,134 B2* | 7/2018 | Hayasaka | G06F 3/0482 |
| 10,114,532 B2* | 10/2018 | Krishnaswamy | G06F 3/04845 |
| 10,198,671 B1* | 2/2019 | Yang | G06T 11/60 |
| 10,275,513 B1* | 4/2019 | Cowan | G06N 3/08 |
| 10,346,441 B2* | 7/2019 | Lacerda | G06F 16/90335 |
| 10,372,991 B1* | 8/2019 | Niemasik | G06F 16/583 |
| 10,380,493 B2* | 8/2019 | Segal | G06N 5/048 |
| 10,419,585 B2* | 9/2019 | Sharma | H04L 67/36 |
| 10,504,010 B2* | 12/2019 | Mao | G06K 9/627 |
| 10,552,430 B2* | 2/2020 | Mowatt | G06F 16/24578 |
| 10,592,082 B2* | 3/2020 | Twist | G06F 8/34 |
| 10,599,701 B2* | 3/2020 | Liu | G06Q 40/00 |
| 2003/0061201 A1 | 3/2003 | Grefenstette et al. | |
| 2004/0075743 A1* | 4/2004 | Chatani | G06F 16/5854 348/207.1 |
| 2005/0030387 A1* | 2/2005 | Pilu | G03B 7/00 348/211.99 |
| 2006/0053126 A1* | 3/2006 | Baca | A61B 8/483 |
| 2006/0197764 A1* | 9/2006 | Yang | G06T 13/80 345/473 |
| 2006/0242638 A1* | 10/2006 | Lew | G06F 9/451 717/168 |
| 2007/0100990 A1 | 5/2007 | Brown et al. | |
| 2007/0238520 A1* | 10/2007 | Kacmarcik | A63F 13/10 463/33 |
| 2008/0003547 A1* | 1/2008 | Woolfe | G06F 16/5838 434/98 |
| 2008/0193016 A1* | 8/2008 | Lim | G06K 9/00711 382/190 |
| 2008/0215310 A1* | 9/2008 | Audant | G06F 13/00 704/9 |
| 2009/0172533 A1* | 7/2009 | Hamzaoui | G06F 9/453 715/704 |
| 2010/0058233 A1 | 3/2010 | Chan et al. | |
| 2011/0271219 A1* | 11/2011 | Krishnan | G16H 40/40 715/771 |
| 2011/0288854 A1* | 11/2011 | Glass | G06F 3/0482 704/9 |
| 2012/0032968 A1* | 2/2012 | Fan | G06F 40/00 345/589 |
| 2012/0054184 A1 | 3/2012 | Masud et al. | |
| 2012/0299942 A1* | 11/2012 | Braun | G06T 11/001 345/589 |
| 2013/0097498 A1 | 4/2013 | Steinberg et al. | |
| 2013/0159220 A1* | 6/2013 | Winn | G06Q 10/10 706/12 |
| 2013/0159408 A1* | 6/2013 | Winn | G06N 20/00 709/204 |
| 2013/0232254 A1 | 9/2013 | Srikanth et al. | |
| 2013/0346898 A1* | 12/2013 | Kokemohr | G06F 3/04845 715/769 |
| 2014/0078075 A1* | 3/2014 | Wilensky | G06F 3/0488 345/173 |
| 2014/0082500 A1* | 3/2014 | Wilensky | G06F 3/0484 715/727 |
| 2014/0143251 A1 | 5/2014 | Wang et al. | |
| 2014/0156567 A1 | 6/2014 | Scholtes | |
| 2015/0007065 A1* | 1/2015 | Krishnamoorthy | G06Q 30/0202 715/760 |
| 2015/0067701 A1* | 3/2015 | VanBlon | G06F 9/451 719/312 |
| 2015/0081703 A1* | 3/2015 | Murphy-Chutorian | G06F 16/58 707/736 |
| 2015/0086091 A1* | 3/2015 | Rezaee | G06K 9/6224 382/128 |
| 2015/0086109 A1* | 3/2015 | Paris | G06K 9/6253 382/155 |
| 2015/0098646 A1* | 4/2015 | Paris | G06T 5/00 382/159 |
| 2015/0120732 A1 | 4/2015 | Nemery et al. | |
| 2015/0185995 A1* | 7/2015 | Shoemaker | H04M 1/72563 715/708 |
| 2015/0347926 A1 | 12/2015 | Fuchs | |
| 2015/0379428 A1 | 12/2015 | Dirac et al. | |
| 2015/0379429 A1 | 12/2015 | Lee et al. | |
| 2016/0019460 A1* | 1/2016 | Li | G06F 16/24578 719/318 |
| 2016/0078361 A1 | 3/2016 | Brueckner et al. | |
| 2016/0092085 A1 | 3/2016 | Kitner et al. | |
| 2016/0098519 A1 | 4/2016 | Zwir | |
| 2016/0104057 A1* | 4/2016 | Shen | G06F 16/583 382/159 |
| 2016/0110433 A1 | 4/2016 | Sawhney et al. | |
| 2016/0110442 A1 | 4/2016 | Williams et al. | |
| 2016/0127641 A1* | 5/2016 | Gove | G06T 1/00 348/143 |

(56) References Cited

U.S. PATENT DOCUMENTS

| | | | |
|---|---|---|---|
| 2016/0180235 A1* | 6/2016 | Sabah | G06Q 30/0269 |
| | | | 706/52 |
| 2016/0203386 A1* | 7/2016 | Porecki | G06K 9/00677 |
| | | | 382/159 |
| 2016/0247064 A1* | 8/2016 | Yoo | G06N 3/063 |
| 2016/0360336 A1* | 12/2016 | Gross | H04M 1/72583 |
| 2016/0365114 A1* | 12/2016 | Galant | G06F 16/7867 |
| 2016/0379132 A1 | 12/2016 | Jin et al. | |
| 2016/0380915 A1 | 12/2016 | Umapathy et al. | |
| 2017/0060986 A1 | 3/2017 | Ideses et al. | |
| 2017/0097948 A1* | 4/2017 | Kerr | G06F 3/0482 |
| 2017/0098152 A1* | 4/2017 | Kerr | G06F 3/04842 |
| 2017/0123631 A1* | 5/2017 | Sharma | G06F 3/0482 |
| 2017/0147910 A1* | 5/2017 | Mao | G06K 9/627 |
| 2017/0161651 A1* | 6/2017 | Demarchi | G06F 16/29 |
| 2017/0171580 A1 | 6/2017 | Hirsch et al. | |
| 2017/0213130 A1* | 7/2017 | Khatri | G06N 3/0445 |
| 2017/0249549 A1* | 8/2017 | Bai | G06N 3/0445 |
| 2017/0255455 A1* | 9/2017 | Collier | G06F 11/3438 |
| 2017/0278015 A1 | 9/2017 | Miranda et al. | |
| 2017/0293356 A1 | 10/2017 | Khaderi et al. | |
| 2017/0293842 A1 | 10/2017 | Buchanan et al. | |
| 2017/0308613 A1 | 10/2017 | Zhu et al. | |
| 2017/0344899 A1 | 11/2017 | Zimmerman | |
| 2017/0374178 A1* | 12/2017 | Sharma | H04L 67/36 |
| 2018/0032874 A1 | 2/2018 | Sanchez et al. | |
| 2018/0032882 A1* | 2/2018 | Joshi | G06Q 30/0631 |
| 2018/0046920 A1* | 2/2018 | Yang | G06Q 10/04 |
| 2018/0060736 A1 | 3/2018 | Brewer et al. | |
| 2018/0068083 A1 | 3/2018 | Cohen et al. | |
| 2018/0075128 A1* | 3/2018 | Srinivasan | G06Q 30/0201 |
| 2018/0089799 A1* | 3/2018 | Johnson | G06T 3/403 |
| 2018/0101506 A1* | 4/2018 | Hodaei | G06F 9/451 |
| 2018/0113780 A1* | 4/2018 | Kim | G06F 11/3447 |
| 2018/0129899 A1* | 5/2018 | Harron | G06N 3/0445 |
| 2018/0144126 A1* | 5/2018 | Swinke | G06N 5/025 |
| 2018/0189269 A1* | 7/2018 | Quirk | G06F 40/268 |
| 2018/0192082 A1* | 7/2018 | O'Driscoll | G06Q 10/10 |
| 2018/0225812 A1* | 8/2018 | DiVerdi | G06K 9/4628 |
| 2018/0260698 A1* | 9/2018 | Lin | G06K 9/6276 |
| 2018/0260718 A1* | 9/2018 | Biswas | G06F 40/20 |
| 2018/0268337 A1* | 9/2018 | Miller | G06Q 10/109 |
| 2018/0268548 A1* | 9/2018 | Lin | G06T 7/11 |
| 2018/0307670 A1* | 10/2018 | Hicks | G01C 23/005 |
| 2018/0336415 A1* | 11/2018 | Anorga | G06K 9/6267 |
| 2018/0357321 A1* | 12/2018 | Cheng | G06N 3/0445 |
| 2018/0359199 A1* | 12/2018 | Nguyen | G06Q 10/107 |
| 2019/0005090 A1* | 1/2019 | Zhang | G06F 16/2425 |
| 2019/0043074 A1* | 2/2019 | Peysakhovich | G06Q 30/0244 |
| 2019/0043075 A1* | 2/2019 | Peysakhovich | G06Q 30/0244 |
| 2019/0050392 A1* | 2/2019 | Clements | G06F 3/04886 |
| 2019/0068526 A1* | 2/2019 | Xie | H04L 67/303 |
| 2019/0140995 A1* | 5/2019 | Roller | G06F 40/186 |
| 2019/0147231 A1* | 5/2019 | Kim | G06N 3/049 |
| | | | 382/181 |
| 2019/0228273 A1* | 7/2019 | Merrill | G06K 9/6202 |
| 2019/0278844 A1* | 9/2019 | Brixey | G06F 40/295 |
| 2019/0286747 A1 | 9/2019 | Modarresi et al. | |

OTHER PUBLICATIONS

"Final Office Action", U.S. Appl. No. 14/751,449, dated Jun. 28, 2019, 11 pages.

"Final Office Action", U.S. Appl. No. 14/751,449, dated Jul. 31, 2018, 12 pages.

"Non-Final Office Action", U.S. Appl. No. 14/751,449, dated Mar. 29, 2019, 11 pages.

"Non-Final Office Action", U.S. Appl. No. 14/751,449, dated Sep. 12, 2017, 10 pages.

Bowman, "Generating Sentences from a Continuous Space", SIGNLL Conference on Computational Natural Language Learning (CONLL), 2016, May 12, 2016, 12 pages.

Chelba, "N-gram Language Modeling using Recurrent Neural Network Estimation", Jun. 20, 2017, 10 pages.

Dieng, "TopicRNN: A Recurrent Neural Network with Long-Range Semantic Dependency", Feb. 27, 2017, 13 pages.

Logeswaran, "Sentence Ordering using Recurrent Neural Networks", Nov. 8, 2016, 15 pages.

Oshri, "There and Back Again: Autoencoders for Textual Reconstruction", Retrieved at: https://www.semanticscholar.org/paper/There-and-Back-Again-Autoencoders-for-Textual-Reco-Oshri-Khandwala/ce4c4564dd9f05720673cd9234571ae992f92048?tab=abstract—on Nov. 17, 2017, 9 pages.

Palangi, "Deep Sentence Embedding Using Long Short-Term Memory Networks: Analysis and Application to Information Retrieval", EEE/ACM Transactions on Audio, Speech, and Language Processing, Jan. 16, 2016, 25 pages.

Shi, "RNN language model with word clustering and class-based output layer", Jul. 22, 2013, 7 pages.

Sporleder, "Automatic Paragraph Identification: A Study across Languages and Domains", Jan. 1, 2004, 8 pages.

Sutskever, "Sequence to Sequence Learning with Neural Networks", in Advances in neural information processing systems, 2014., Dec. 14, 2014, 9 pages.

"Non-Final Office Action", U.S. Appl. No. 15/923,839, dated Dec. 3, 2019, 20 pages.

"Pre-Interview First Office Action", U.S. Appl. No. 15/923,839, dated Jan. 21, 2020, 6 pages.

"Final Office Action", U.S. Appl. No. 15/923,839, dated Jun. 1, 2020, 22 pages.

"First Action Interview Office Action", U.S. Appl. No. 15/923,839, dated Jun. 19, 2020, 5 pages.

"Final Office Action", U.S. Appl. No. 15/923,839, dated Oct. 30, 2020, 19 pages.

"Notice of Allowance", U.S. Appl. No. 14/751,449, dated Sep. 30, 2020, 7 pages.

\* cited by examiner

500

502
Obtain application usage data that describes photo-editing actions performed by existing users with a photo-editing application to edit digital photographs

504
Determine a photo-editing language based on the application usage data by representing the photo-editing actions as words and applying at least one natural language processing technique to the words

506
Determine known workflows based on the photo-editing language, a known workflow comprising a combination of the photo-editing actions commonly performed together to produce an edit in different digital photographs

508
Receive application usage data that describes current photo-editing actions performed by a user of the photo-editing application in relation to at least one digital photograph

510
Predict a current workflow of the user in relation to editing the at least one digital photograph by identifying one of the known workflows based on the words of the photo-editing language that represent the current photo-editing actions

512
Output at least one recommended tool via a user interface of the photo-editing application, the at least one recommended tool usable to carry out the photo-editing actions associated with the current workflow

PHOTO-EDITING APPLICATION RECOMMENDATIONS

BACKGROUND

Computing applications range significantly in their perceived complexity. Some applications, for instance, are immediately intuitive. Many users may be able to leverage the functionality of these applications when first exposed to them without much, if any, instruction regarding how to use the applications. Other applications, however, may not be intuitive for most users. These applications may require at least some amount of prior knowledge, learning, or experimentation in order to utilize the corresponding functionality. Such applications may have an abundance of functionality buried in menus, accessible through particular dialogs, initiated by keyboard shortcuts, and so forth.

Conventional systems that inform users about the functionality of photo-editing applications enable users to search for desired functionality and how to accomplish certain edits using the photo-editing application. Responsive to a search, articles explaining how to use certain tools and videos demonstrating this use may be returned, such that a user can select to view the articles and videos. Systems that provide information in this way, however, place the responsibility of obtaining more information about how a photo-editing application can be used on the user. This may seem tedious to many users though. As a result, many users may not know about functionality that may be useful for achieving particular edits or may not learn an easiest way to accomplish an edit for which they use a photo-editing application. Consequently, users may become frustrated with the application. User frustration with these systems can have widespread effects, such as users telling their family, friends, and coworkers that the photo-editing application does not include functionality or is too difficult to use—when the application may actually include the functionality and the edits may be more easily accomplished than conveyed. Effects can also include users discontinuing their subscriptions to a suite of such applications, deciding not to purchase applications based on information propagated by existing users, and so on.

SUMMARY

To overcome these problems, photo-editing application recommendations are delivered in a digital medium environment. A language modeling system generates a photo-editing language model based on application usage data collected from existing users of a photo-editing application. The language modeling system generates the model by applying natural language processing to words that are selected to represent photo-editing actions described by the application usage data. The natural language processing involves partitioning contiguous sequences of the words into sentences of the modeled photo-editing language and partitioning contiguous sequences of the sentences into paragraphs of the modeled photo-editing language. The language modeling system deploys the photo-editing language model for incorporation with the photo-editing application. The photo-editing application uses the model to determine a current workflow in real-time as input is received to edit digital photographs, and recommends tools for carrying out the current workflow.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 5 depicts a procedure in an example implementation in which a photo-editing language is used to determine a current workflow of a user in relation to editing a digital photograph and to recommend tools for carrying out the current workflow.

DETAILED DESCRIPTION

Overview

Figure 1:
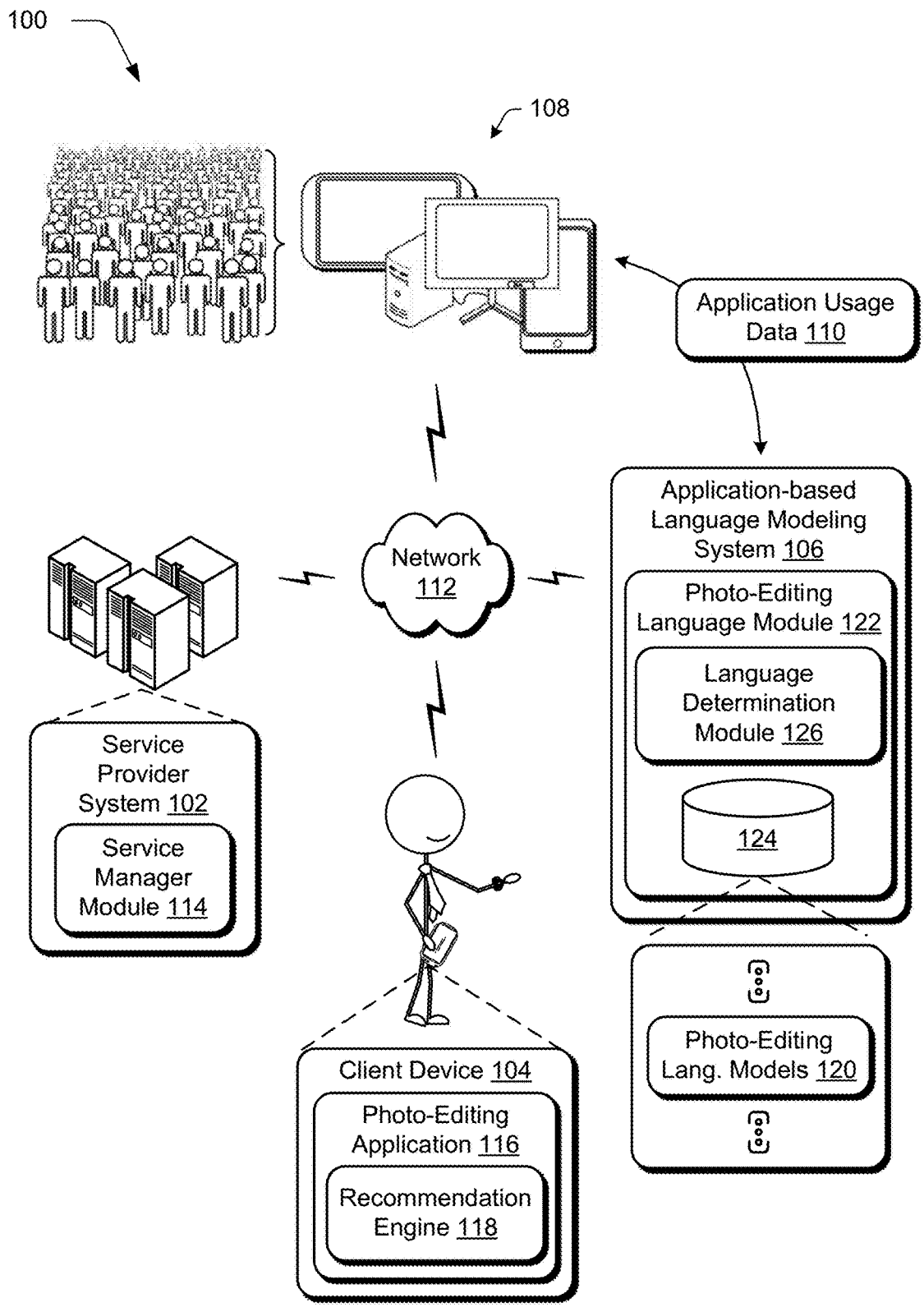
FIG. 1 is an illustration of an environment in an example implementation that is operable to employ techniques described herein.

Some photo-editing applications require at least some amount of prior knowledge, learning, or experimentation in order to utilize their functionality. Conventional systems that inform users about the functionality of these photo-editing applications may place the burden of initiating this informing on users. For instance, these conventional systems may enable a user to initiate a search for functionality, and then present information describing how to accomplish an edit with an application responsive to the search. However, this may seem tedious to many users. As a result, many users may not learn about functionality that can be useful to them or may not learn an easiest way to perform an edit on a digital photograph with an application. Consequently, users may become frustrated with photo-editing applications. User frustration can have widespread effects, such as users telling their family, friends, and coworkers that the photo-editing application does not include functionality or is too difficult to use—when the application may actually include the functionality and the edits may be more easily accomplished than conveyed. Effects can also include users discontinuing their subscriptions to a suite of such applications, deciding not to purchase applications based on information propagated by existing users, and so on.

To overcome these problems, photo-editing application recommendations are delivered in a digital medium environment. A language modeling system generates a photo-editing language model based on application usage data collected from existing users of a photo-editing application. In general, this application usage data describes photo-editing actions performed by the existing users in relation to digital photographs with the photo-editing application. An example of such application usage data is clickstream data. Regardless, the language modeling system generates the photo-editing language model by representing the photo-editing actions as words and applying natural language processing to these words.

Given sequences of contiguous words, as indicated by the application usage data, the language modeling system partitions the sequences into sentences of the modeled photo-editing language. By way of example, the language modeling system uses a bidirectional long short-term memory (LSTNI) based recurrent neural network (RNN) to train the photo-editing language model. In particular, the language modeling system trains the photo-editing language model to predict a previous word and a next word for a current word in a sequence of the photo-editing action words. The language modeling system uses these predictions to determine whether the current word corresponds to a sentence boundary, e.g., an end or a beginning of a photo-editing sentence.

Once the sentences are determined, the language modeling system partitions contiguous sequences of the sentences into paragraphs of the modeled photo-editing language. To partition the sequences of sentences into paragraphs, the language modeling system measures characteristics of proximate sentences. For example, the language modeling system measures a coherence of a current sentence based on previous sentences. The language modeling system also generates interpolated sentences (e.g., using linear interpolation) between two given sentences of a contiguous sequence, and measures a similarity between the interpolated sentences and the actual sentences present between the two given sentences. The language modeling system partitions the sequences of sentences based on these measurements.

The language modeling system then forms known workflows by combining the determined paragraphs. Unlike the sentences and paragraphs, the workflows may or may not be determined as contiguous sequences of the underlying data structure, e.g., the paragraphs of the photo-editing language. Rather, the language modeling system forms these workflows, in part, by combining paragraphs one with another based on one or more associations specified in the application usage data. By way of example, these associations may correspond to labels that provide further information about a photo-editing action, such as an image relative to which a photo-editing action is performed, a computing device with which a photo-editing action is performed, a time at which a photo-editing action is performed, and so forth. In general, the language modeling system trains the photo-editing language model to predict one of these known workflows as photo-editing actions are performed to edit a digital photograph.

To this end, the language modeling system deploys the photo-editing language model for incorporation with the photo-editing application, e.g., as a dynamic software library, an executable, and so forth. As user input is received via a client device to edit a digital photograph with the photo-editing application, a stream of data indicative of such photo-editing actions is provided as input to the photo-editing language model in real-time. Based on its training, the photo-editing language model outputs a current workflow based on the stream of data. The photo-editing application then determines one or more tools for helping a user carry out the current workflow in relation to the digital photograph. The photo-editing application recommends determined tools via one or more user interfaces associated with the application, such as via panels within a window of the photo-editing application, a function bar displayed via an auxiliary input device, an overlay displayed via a virtual or augmented reality device, and so on.

In this way, the language modeling system enables photo-editing applications to teach users how to carry out workflows for editing digital photographs like expert users. Consequently, users of photo-editing applications that leverage the described systems may become proficient with those applications more quickly than users of other photo-editing applications. As a result of becoming proficient with these photo-editing applications quicker, users may decide to continue their subscriptions for the applications, tell others to purchase the applications, inform others that the applications have desired functionality and how to access that functionality, and so forth.

Term Descriptions

As used herein, the term "digital photograph" refers to a digital image depicting photorealistic content captured with one or more imaging sensors, e.g., of a digital camera. Example file types of digital photographs include, .jpeg, .png, .tiff, high dynamic range (HDR) image files, raw image files, and so forth. In one or more implementations, the functionality of the language modeling system may also be leveraged to provide photo-editing application recommendations in relation to digital video having photorealistic content, e.g., to recommend tools for carrying out a current workflow in relation to digital video and/or frames of digital video.

As used herein, the term "photo-editing action" refers to an action performed in relation to at least one digital photograph with a photo-editing application responsive to one or more user inputs. By way of example, photo-editing actions may include selecting a menu option to import digital photographs into a photo-editing application, selecting digital photographs to import from a file-selection dialog, selecting one or more imported digital photographs to which photo-editing operations are to be applied, selecting a portion of a digital photograph that is a focus of edits, interacting with user interface instrumentalities to perform edits (e.g., movement of a slider to adjust some visual characteristic of a selected portion of a digital photograph), selecting a menu option to render digital photographs (e.g., into a digital image file to save edits, for printing via a printer, etc.), adding metadata to digital photographs, and so forth.

As used herein, the term "session" refers to a period during which a user interacts with a photo-editing application and which has a particular starting point and a stopping point. Different starting and stopping points may be used to define sessions differently. An example of a starting and stopping point for defining a session may be when an application is launched (starting point) and when the application is exited (stopping point). Another example starting point is when digital photographs being edited are opened, and another example stopping point is when the digital photographs being edited are closed. Further still, a starting point may correspond to a time when a user starts interacting with a photo-editing application after a period of inactivity and a stopping point may correspond to a last tool used or action performed before a next period of inactivity with the photo-editing application. It should be appreciated that a variety of different starting and stopping points may be used to define a session of user interaction with a photo-editing application without departing from the spirit or scope of the techniques described herein.

As used herein, the term "clickstream data" refers to data that represents a recording of parts of a screen on which a user clicks (e.g., with a mouse cursor or taps with a finger or stylus) while using a software application. Generally, as the user clicks (or taps) anywhere on a user interface of the application, the action is logged, e.g., in an application log than can be maintained in storage and communicated over a network.

As used herein, the term "human-readable" or "natural" language refers to human languages such as English.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ photo-editing application recommendations described herein. The illustrated environment 100 includes a service provider system 102, client device 104, application-based language modeling system 106 ("language modeling system 106"), and sources 108 of application usage data 110 that are communicatively coupled, one to another, via a network 112.

Computing devices that are usable to implement the service provider system 102, client device 104, language modeling system 106, and sources 108 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 102 is illustrated as including a service manager module 114 that is representative of functionality to provide services accessible via the network 112 that are usable to make products or services available to consumers. The service manager module 114, for instance, may expose updates, content, or functionality that is accessible via the network 112 by a photo-editing application 116 of the client device 104. The photo-editing application 116 may be include a variety of functionality that involves obtaining data from the service provider system 102 via the network 112. This data can be employed by the photo-editing application 116 to enable a user of the client device 104 to communicate with the service provider system 102 to perform a variety of actions in connection with the service provider system 102, such as to download content (e.g., images, videos, filters, sequences of photo-editing actions, and so on) when the service provider system 102 maintains content for distribution.

In order to deliver recommendations for photo-editing actions, the photo-editing application 116 includes recommendation engine 118. In general, the recommendation engine 118 represents functionality to predict a workflow of a user of the client device 104 in relation to editing a digital photograph with the photo-editing application 116. The recommendation engine 118 is also capable of causing one or more recommendations related to the predicted workflow to be presented via a user interface associated with the photo-editing application 116. By way of example, the recommendations may present tools for carrying out tasks associated with the workflow, preselect values of different attributes (e.g., shadows, temperature, exposure, clarity, color channels, and so forth) to enable performance of those tasks, and so forth. Tools and instrumentalities for carrying out the recommended actions may be presented in a panel of the photo-editing application 116's user interface, in a toolbar presented on an auxiliary input device (e.g., mobile device, keyboard having dynamic display portions, and so on), via an augmented reality device through which a display device of the client device 104 is viewed, and so forth. To predict the workflow, the recommendation engine 118 treats actions and sequences of these actions performed with the photo-editing application 116 as a language. To this extent, the recommendation engine 118 may include data that models a determined photo-editing language.

In order to generate photo-editing language models 120, the service provider system 102 may employ the language modeling system 106. Although functionality of the language modeling system 106 is illustrated as separate from the service provider system 102, this functionality may also be incorporated as part of the service provider system 102, further divided among other entities, and so forth. The language modeling system 106 includes a photo-editing language module 122 that is implemented at least partially in hardware of a computing device to provide the photo-editing language models 120, which are illustrated stored in storage 124. In general, the recommendation engine 118 may incorporate one or more of the photo-editing language models 120 generated by the photo-editing language module 122—these may be generated by the photo-editing language module 122 to deliver photo-editing recommendations specifically for the photo-editing application 116.

The photo-editing language models 120 represent functionality to predict a workflow of a client device user in relation to editing a digital photograph. In general, the photo-editing language model 120 predicts the workflow based on photo-editing actions already performed in connection with editing the digital photograph, e.g., selections to import one or more digital photographs into an application, selection of a single digital photograph for editing, selections to open one or more instrumentalities for performing photo-editing operations, and so forth. In particular, the photo-editing language model 120 treats actions performed in connection with editing digital photographs with the photo-editing application 116 as words of a determined photo-editing language. The photo-editing language model 120 predicts the workflow based on semantic similarities between the photo-editing actions already performed and the photo-editing actions of known workflows. The photo-editing language module 122 represents functionality to build the photo-editing language models 120 from the application usage data 110.

In general, each of the photo-editing language models 120 is built from the application usage data 110 that is collected specifically for the photo-editing application to which the model corresponds. By way of example, a first photo-editing language model, capable of predicting workflows for users of a first photo-editing application, is built from the application usage data 110 collected from existing users of the first photo-editing application. Further, a second photo-editing language model, capable of predicting workflows for users of a second photo-editing application, is built from the application usage data 110 collected from existing users of the second photo-editing application. In this way, the photo-editing language module 122 may determine a photo-editing language on a per-application basis and also generate the photo-editing language models 120 on a per-application basis.

The application usage data 110 used for building the photo-editing language models 120 may be collected from application logs of corresponding photo-editing applications. The application usage data 110 may describe user interaction in terms of selections made by client device users in relation to user interface components of these photo-editing applications. In one or more implementations, this application usage data 110 is clickstream data, which refers to data that records regions of a screen a user clicks on while using a software application. In connection with interfaces that allow other types of interaction, such as voice- or gaze-based user interfaces, the application usage data 110 may be configured differently. In any case, the application usage data 110 is capable of indicating the tools application users select, operations performed in relation to digital photographs with the tools, orders in which different client device users use tools, a result of tool usage on a digital photograph being modified, and so on. The application usage data 110 may also include the digital photographs on which client device users operated. In this way, the workflows performed in relation to certain types of digital photographs (e.g., portraits versus landscapes) can be determined and used to recommend corresponding photo-editing actions.

The application usage data 110 may also describe a type of client device user performing the photo-editing, e.g., client device users identified as digital photo-editing "experts" or "beginners". A user type may be self-defined, such as when a client device user designates an "expert" or "beginner" status in connection with installing a photo-editing application. A client device user may be defined as an expert or beginner in other ways without departing from the spirit or scope of the techniques described herein. By way of example, the application usage data 110 may indicate usage patterns associated with expert or beginner users, e.g., an order in which tools are used may be indicative of an expert or beginner, the use of tools in connection with certain tasks may be indicative of expert or beginner, and so on. Accordingly, a client device user may be identified as an "expert" by the photo-editing language module 122 when their application usage data includes patterns associated with expert users. By using application usage data 110 collected from expert users, the recommendation engine 118 can recommend tools and actions in scenarios where expert users would use the tools and perform the actions. In this way, the recommendation engine 118 may teach beginner users how to use the photo-editing application 116 like expert users. Consequently, client device users of applications that employ the described techniques may become proficient with those applications more quickly than other applications.

To build the photo-editing language models 120, the photo-editing language module 122 may employ the language determination module 126. The language determination module 126 represents functionality to convert sequences of photo-editing actions described by the application usage data 110 into human (natural) language. As part of this, the language determination module 126 may convert each photo-editing action into a word or words. For example, the language determination module 126 may convert application usage data 110 indicating a user selection to import an album of digital photographs to the text 'import_photographs'. Accordingly, the application usage data 110 may be converted into sequences of natural-language words that correspond to tools selected and actions performed by client device users within photo-editing applications.

Using one or more natural language processing (NLP) techniques (e.g., LSTM), the language determination module 126 is configured to determine sequences of photo-editing action words that correspond to sentences of a photo-editing language, sequences of the sentences that correspond to paragraphs of the photo-editing language, and combinations of the paragraphs that correspond to workflows that users perform in relation to photos being edited. The language determination module 126 leverages machine-learning techniques to determine the photo-editing language and produce the photo-editing language models 120. The language determination module 126 can use any type of machine-learning techniques capable of learning the photo-editing language from observed use of a photo-editing application and also predicting sequences of photo-editing "words" based on this observed use. According to various implementations, such a machine-learning model uses supervised learning, unsupervised learning, or reinforcement learning. For example, the machine-learning model can include, but is not limited to, auto encoders, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. The language determination module 126 may use machine-learning techniques to continually train and update the machine-learning model (or, in other words, to update a trained machine-learning model) to accurately identify sequences of photo-editing words based on the observed use and feedback from users.

Each sequence of photo-editing words corresponding to a workflow may be associated with one or more recommendations. These recommendations may be surfaced as application tools for performing photo-editing operations of a predicted workflow. In this way, the recommendation engine 118 may teach a user about tools of a photo-editing application and actions the user can perform with the tools in situations where expert photo-editors use the tools. Furthermore, these recommendations are presented without client device users initiating a search. This can alleviate the burden of having to think of search terms for finding an appropriate tool to carry out desired photo-editing actions. In connection with photo-editing applications, this allows users to expend their energy deciding how to modify digital photographs rather than spend it figuring out how to achieve a particular modification.

Having considered an example environment, consider now a discussion of some example details of the techniques for photo-editing application recommendations in accordance with one or more implementations.

Photo-Editing Application Recommendations

Figure 2:
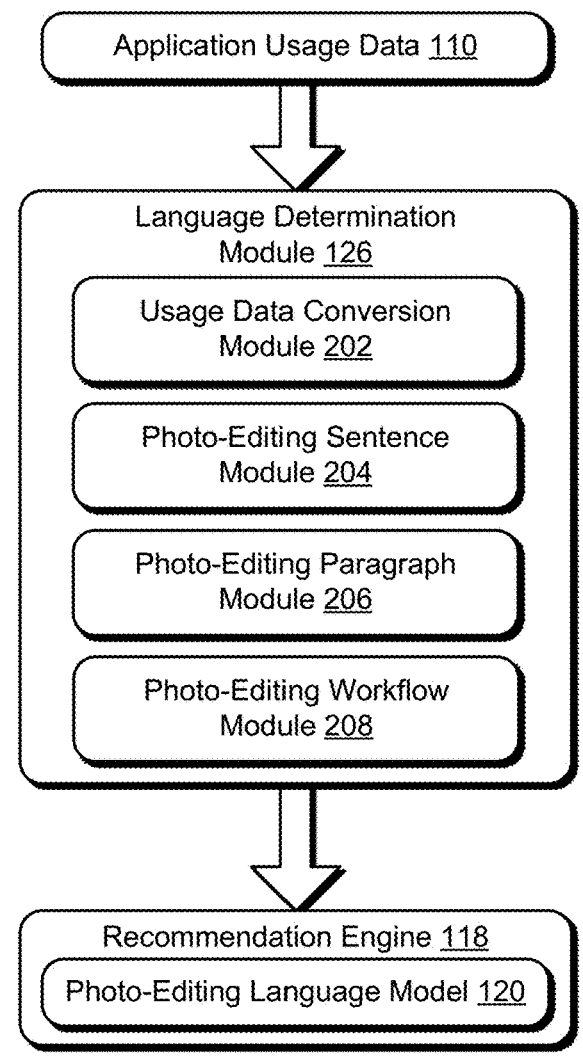
FIG. 2 depicts an example implementation in which a language modeling system of FIG. 1 uses application usage data of existing photo-editing application users to generate a recommendation engine for delivering photo-editing recommendations.

FIG. 2 depicts a system 200 in an example implementation in which the language modeling system 106 of FIG. 1 uses application usage data of existing photo-editing application users to generate a recommendation engine for delivering photo-editing recommendations.

The illustrated system 200 is depicted with the language determination module 126 of the language modeling system 106 of FIG. 1. In this example, the language determination module 126 includes usage data conversion module 202, photo-editing sentence module 204, photo-editing paragraph module 206, and photo-editing workflow module 208. In general, the usage data conversion module 202, the photo-editing sentence module 204, the photo-editing paragraph module 206, and the photo-editing workflow module 208 represent functionality of the language determination module 126 to generate the photo-editing language model 120 from the application usage data 110.

The language determination module 126 is shown obtaining the application usage data 110 as input. As described above, the application usage data 110 describes user interactions with photo-editing applications, such as selections made by users relative to user interface components of an application. As also noted above, the application data 110 may be configured as clickstream data in accordance with one or more implementations. Regardless of the format, the usage data conversion module 202 represents functionality to convert actions described by the application usage data 110 to human-readable (natural) language words.

The usage data conversion module 202 converts the application usage data 110 that is indicative of an action performed on a digital photograph with a photo-editing application to a word or group of words (e.g., a bi-gram or tri-gram) indicative of the action. Each time the usage data conversion module 202 encounters the application usage data 110 indicative of a particular action, the usage data conversion module 202 converts that data to a same word or same group of words associated with the particular action. When multiple users interact with a particular photo-editing application over many different sessions, the usage data conversion module 202 may generate a large amount of digital content (e.g., text documents) having words indicative of the actions performed with the photo-editing application.

By converting user actions with a photo-editing application to words, the language determination module 126 can leverage a variety of natural language processing (NLP) techniques. Accordingly, the language determination module 126 treats actions performed in relation to editing digital photographs as words. These words correspond to a vocabulary of a photo-editing language determined for the photo-editing application. Based on this, the language determination module 126 leverages various functionality to determine sequences of these words, groupings of these words, sentence formation, sentence disambiguation, and so forth.

The photo-editing sentence module 204 represents functionality to define and identify sentences of the photo-editing language from the application usage data 110. The photo-editing sentence module 204 also represents functionality to disambiguate sentences identified in the photo-editing language and determine semantics of these sentences. As part of doing so, the photo-editing sentence module 204 initially partitions sequences of the words-for-actions ("words") into sentences. In particular, the photo-editing sentence module 204 trains the photo-editing language model 120 (or one of an ensemble of models combined to form the photo-editing language model 120) to estimate a probability of a prior word and a next word. This training involves the photo-editing sentence module 204 exposing the photo-editing language model 120 to the observed sequences of words from the application usage data 110. The photo-editing sentence module 204 exposes the photo-editing language model 120 to the observed sequences of words both forward (e.g., in an order that the corresponding actions were performed) and backward (e.g., in a reverse order the actions were performed). The photo-editing sentence module 204 learns to predict prior and next words based on this exposure and on comparison of words predicted during training to the words of observed sequences.

In one or more implementations, the language determination module 126 generates the photo-editing language model 120 as a neural network. The photo-editing sentence module 204 leverages one or more training techniques for training the photo-editing language model 120 configured as a neural network. For example, the photo-editing sentence module 204 uses bidirectional long short-term memory (LSTM) to train the photo-editing language model 120, configured as a recurrent neural network (RNN). Here, the LSTM-training captures global context surrounding a word or phrase (e.g., combination of words) and also captures context associated with true boundaries. In connection with this LSTM and RNN training, the photo-editing sentence module 204 determines whether a current word under consideration is part of an n-gram—a combination of words (e.g., "n" words, where "n" is some number greater than 1).

To do so, the photo-editing sentence module 204 forms n-grams with the current word and neighboring words in the respective sequence. The photo-editing sentence module 204 also estimates a likelihood that these formed n-grams correspond to a sequence of actions performed together to carry out a particular photo-editing operation. Given this, the photo-editing sentence module 204 computes a sentence score using a decay function that captures the probability and length of a formed n-gram. The photo-editing sentence module 204 then uses the computed score as a basis to determine whether the current word corresponds a sentence boundary, e.g., a start or end of a photo-editing sentence.

In accordance with the techniques described herein, "sentences" are assumed to be a smallest, standalone grouping of photo-editing words. This is similar to natural languages, and it is further assumed that, through the LSTM and RNN training, the photo-editing language model 120 associates continuous words of a sequence with each other in a way that makes semantic sense. After the photo-editing sentence module 204 detects sentence boundaries for sequences of the words, the photo-editing sentence module 204 reduces noise in the sentences and summarizes the sentences. To do so, the photo-editing sentence module 204 may leverage one or more language denoising and summarization techniques, such as LSTM-based auto-encoding of sentences. In one or more implementations, the photo-editing sentence module 204 generates the auto-encodings of the sentences. These auto-encodings are effective to represent semantical equivalence of the source sentences (e.g., the corresponding portion of the sequence of words as they are observed in the application usage data 110). The semantical equivalence is further effective to describe a summary of the sentence under consideration, an intent of the performed actions corresponding to the sentence, and also reduces noise present in the sentences. Accordingly, the photo-editing sentence module 204 is configured to generate encoded sentences, e.g., according to the auto-encoding.

After the sentences are denoised and summarized, the photo-editing paragraph module 206 identifies paragraphs—groups of sentences corresponding to units of photo-editing work—in a sequence of actions. As part of this, the photo-editing paragraph module 206 identifies coherence in a generated sequence of the encoded sentences, using one or more coherence techniques. By way of example, the photo-editing paragraph module 206 employs a sentence-level LSTM and RNN approach to measure a coherence of a sentence based on previously observed sentences. The photo-editing paragraph module 206 further employs the sentence-level LSTM and RNN approach to measure a similarity of interpolated sentences and sentences present between two given sentences in a paragraph.

In one or more implementations, the photo-editing paragraph module 206 is configured to compute a coherence score according to the following discussion. In this discussion, a partial or complete paragraph may be represented by the term $Par_k$ and the term k represents a number of contiguous (auto-encoded) sentences of this partial or complete paragraph. The contiguous sentences of this partial or complete paragraph may correspond to random variables represented as $(S_1, S_2, \ldots, S_k)$ and also have sentence assignments $(s_{p1}, s_{p2}, \ldots, s_{pk})$. The sentence assignments correspond to the conditional probabilities computed by the photo-editing sentence module 204 in connection with the above-discussed sentence detection and auto-encoding. In any case, the photo-editing paragraph module 206 may compute the coherence score according to the following in one or more examples:

$$\sum_{i=1}^{k} \log p(S_i = s_{pi} | S_1 = s_{p1}, S_2 = s_{p2}, \ldots, S_{i-1} = s_{pi-1})$$

Here, the photo-editing paragraph module 206 may interpolate sentences based on one or more sentence interpolation techniques, such as based on homotopy (linear interpolation) between codes corresponding to the sentences. The photo-editing paragraph module 206 may compute these codes based on space of the auto-encoded sentences. Further, the photo-editing paragraph module 206 may determine a homotopy between two codes, $\vec{zs}_1$ and $\vec{zs}_2$, as a set of points on a line $\vec{z}(t)$, which may be defined in one or more implementations as follows:

$$\vec{z}(t) = \vec{zs}_1 * t + \vec{zs}_2 * (1-t), t \in [0,1]$$

The photo-editing paragraph module 206 analyzes sentences between any two sentences in a paragraph, and determines how different these actual sentences are from one or more interpolated sentences between the two given sentences. Where the photo-editing paragraph module 206 determines at least a threshold association between contiguous sentences, the photo-editing paragraph module 206 identifies such coherent sentences as part of a single unit of work or a "paragraph". The photo-editing paragraph module 206 may determine these associations based on one or more of observed associations at a global level (how sentences are relatively sequenced in the application usage data 110), temporal proximity of the sentences, and content similarity. Consider an example in which a client device user carries out a sequence of contiguous actions using instrumentalities presented via a single portion of a user interface, e.g., a single panel. Although different sequences of actions may be carried out using different instrumentalities of this portion, the photo-editing paragraph module 206 may ultimately determine that a sequence of contiguous actions performed using the instrumentalities within this portion is a paragraph. An action performed outside this portion (e.g., in a different panel of the user interface) may be determined as a start of a next paragraph.

After paragraphs are determined, the language determination module 126 leverages the functionality of the photo-editing workflow module 208 to identify a workflow associated with a sequence of actions. In general, a "workflow" corresponds to a group of paragraphs, which may not be contiguous. Further, the sentences of one paragraph of a workflow may not be coherent (according to the above-discussed measure) to sentences of a next or other paragraphs of the workflow. Regardless of sentence coherence across paragraphs, the paragraphs of a given workflow are individually or collectively relevant to a common photographic context. By way of example, one workflow may include importing a digital photograph into a photo-editing application, removing blemishes from one or more persons depicted in the digital photograph, and rendering the digital photograph, e.g., printing the photograph via a printer or converting the file for saving into any one of a variety of different image formats. In this example, the photo-editing paragraph module 206 may have identified actions associated with importing the digital photograph as one paragraph and actions associated with blemish removal as a different paragraph. Nonetheless, these two paragraphs may be part of a single workflow, e.g., a blemish removal workflow.

In general, the paragraphs of a given workflow may not have a relatively high pairwise coherence. Rather, the photo-editing workflow module 208 may determine workflows, at least in part, by labelling actions with labels indicative of an image being edited, a device involved with the editing, and so on. The photo-editing workflow module 208 thus determines the paragraphs that correspond to each workflow according to the labels. Based on this, the photo-editing workflow module 208 trains the photo-editing language model 120, as an LSTM and RNN model, to associate identified paragraphs with each other to form workflows. Depending on the observed application usage data 110, a cost function may not be inherent in this data for associating paragraphs—although it is inherent in the data for sentence boundary detection.

While training the photo-editing language model 120, the language determination module 126 identifies groups of paragraphs as workflows. These groups are sub-sequences of an original sequence of paragraphs, e.g., ordered as the paragraphs are encountered in the application usage data 110. Moreover, the language determination module 126 identifies these paragraphs for training based one or more of corresponding to a same photo-editing session with a photo-editing application, corresponding to a same digital photograph, corresponding to a same portion of a user interface of the photo-editing application (e.g., actions performed with instrumentalities from a same user interface panel), having temporal proximity, corresponding to a same photographic context, and so forth.

In addition, the photo-editing workflow module 208 represents functionality to score workflows detected from the application usage data 110 based on different workflow attributes. By way of example, the photo-editing workflow module 208 scores the detected workflows based on a number of different digital photographs relative to which a workflow is carried out, a frequency with which a workflow is carried out, a complexity (e.g., a Kolmogorov complexity) of a workflow, application tools (numbers and types) covered by a workflow, distribution over expert and beginner users, and so forth.

The photo-editing workflow module 208 is further configured to detect workflows as an optimization problem, e.g., having supervised or reinforcement (explore-exploit) learning aspects. To this end, the photo-editing workflow module 208 is also configured to score detected paragraphs based on further attributes including, but not limited to, probabilities (e.g., output by the neural network being trained) of a workflow to correspond to a known workflow, a decay factor which penalizes workflows that are relatively long or relatively shorter (e.g., because relatively long and relatively short workflows are noise or are rare), complexity of workflow, and so forth.

In one or more implementations, the photo-editing workflow module 208 scores workflows detected in the application usage data 110 in accordance with the following discussion. In this discussion, the term $W_l$ represents a workflow having a number of paragraphs l, such that the workflow includes paragraphs ($Par_1$, $Par_2$, . . . , $Par_l$). In one or more implementations, the photo-editing workflow module 208 computes a score for the workflow W according to the following example:

$$(\text{freq}_W)^{\alpha}*(\text{numberimages}_W)^{\beta}*(\text{averageduration}_W)^{\gamma}*\text{complexity}(Par_1, Par_2, \ldots, Par_k)$$

Here, the term $\text{freq}_W$ represents a frequency of occurrence of the workflow in the application usage data 110, the term $\text{numberimages}_W$ represents a number of images in relation to which the workflow has been applied according to the application usage data 110, and the term $\text{averageduration}_W$ represents an average duration of a workflow. The term $\text{complexity}(Par_1, Par_2, \ldots, Par_k)$ represents a compression ratio of the workflow, which is encoded in terms of paragraph entropy. In accordance with the described techniques, the photo-editing paragraph module 206 determines the paragraph entropy in terms of entropy of a paragraph's respective sentences. This entropy of the respective sentences is output by the photo-editing language model 120 during the training. During training, the photo-editing workflow module 208 is also configured to regularize each of the terms $\text{freq}_W$, $\text{numberimages}_W$, $\text{averageduration}_W$, and $\text{complexity}(Par_1, Par_2, \ldots, Par_k)$. These factors are also bounded on each side. In the above discussion, the terms $\alpha$, $\beta$, and $\gamma$ represent weights of the respective terms, which the photo-editing language model 120 learns during training, e.g., based on the LSTM and RNN approach.

After the language determination module 126 leverages the functionality of the usage data conversion module 202, the photo-editing sentence module 204, the photo-editing paragraph module 206, and the photo-editing workflow module 208 to train the photo-editing language model 120, it is incorporated into the recommendation engine 118 for deployment at a suitably configured photo-editing application, such as the photo-editing application 116. Broadly speaking, the recommendation engine 118 leverages the photo-editing language model 120 to detect sentence boundaries and paragraphs given a sequence of photo-editing actions performed by a user with the photo-editing application 116. The recommendation engine 118 also further trains the photo-editing language model 120, once deployed, based on actions performed by a user of the client device 104 with the photo-editing application 116. In other words, the recommendation engine 118 updates the photo-editing language captured by the photo-editing language model 120. The recommendation engine 118 can thus use the updated photo-editing language to predict current workflows in relation to editing digital photographs in the future. In this way, the photo-editing language model 120 learns preferred action sequences of the client device 104's user, predicts those sequences in the future, and provides recommendations accordingly. In the context of using the recommendation engine 118 and the photo-editing language model 120, consider FIG. 3.

Figure 3:
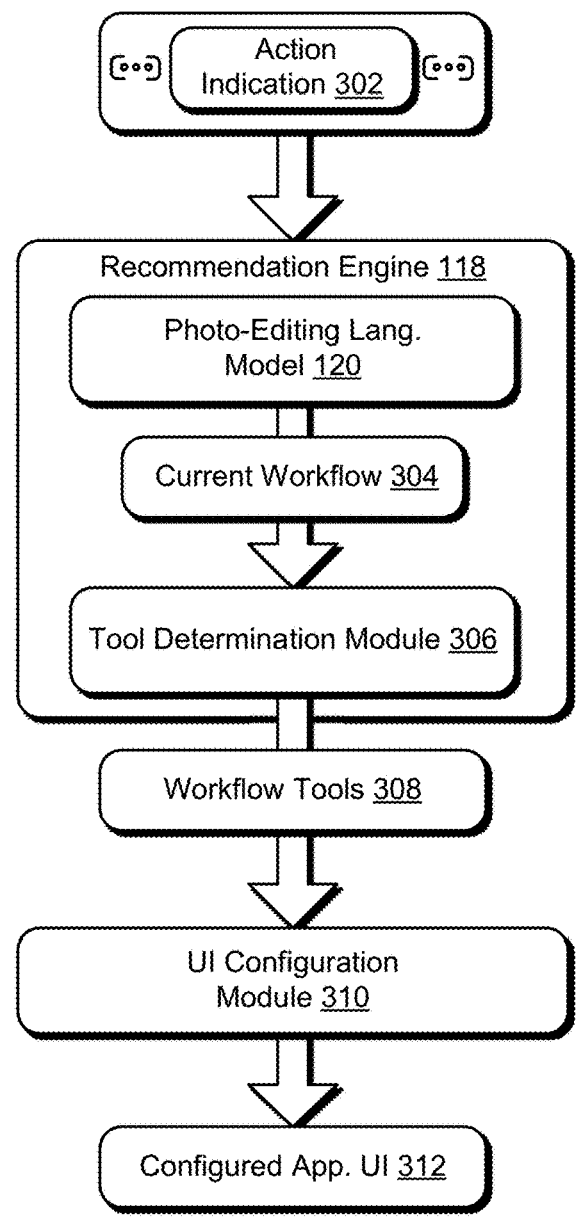
FIG. 3 depicts an example implementation in which a recommendation engine of FIG. 1 predicts a workflow of a client device user in relation to editing a digital photograph and makes photo-editing recommendations for the workflow.

FIG. 3 depicts an example implementation 300 in which a recommendation engine of FIG. 1 predicts a workflow of a client device user in relation to editing a digital photograph and makes photo-editing recommendations for the workflow. In use, the recommendation engine 118 receives data indicative of a stream of actions performed by a user of the client device 104 with the photo-editing application 116. The illustrated example 300 includes action indication 302, which represents data describing one such action. The illustrated example 300 also includes ellipses surrounding the action indication 302 to represent that the recommendation engine 118 receives a stream of these action indications, which are received in real-time as the actions are performed via the photo-editing application 116.

Based on the received action indications 302, the recommendation engine 118 determines a current workflow 304 by leveraging functionality of the photo-editing language model 120. The photo-editing language model 120 obtains the sequence of actions indicated by the action indications 302 as input and outputs the current workflow 304. As noted above, the photo-editing language model 120 may be configured as an RNN. Thus, the predicted current workflow 304 corresponds to the output of the RNN. In any case, as part of predicting the current workflow 304, the photo-editing language model 120 attempts to detect a sentence and/or paragraph boundary as each action indication 302 is received. Based on the received action indications 302, the photo-editing language model 120 generally identifies the current workflow 304 from a plurality of known workflows. In particular, the current workflow 304 may be identified as a known workflow that is contextually similar to a photographic context, as indicated by the action indications 302. In one or more implementations, the photo-editing language model 120 selects the current workflow 304 deterministically based on initially identifying workflows that include paragraphs already observed in the received sequence of action indications 302. Once the workflows with these already-observed paragraphs are identified, the photo-editing language model 120 further performs the selection from among the identified workflows based on the above described scores. In other words, the photo-editing language model 120 scores these workflows using the above-discussed coherence score and an interpolation factor.

As the photo-editing language model 120 processes the sequence of action indications 302 in operation to detect paragraph boundaries, a current paragraph generally is only a partial paragraph. Due to this, the photo-editing language model 120 may change a determined current paragraph as action indications 302 are received. Further, the photo-editing language model 120 may select a different current workflow 304 based on changes to the current paragraph. Broadly speaking, inclusion or not with a current paragraph is based on whether a new sentence is coherent to proximal previous sentences—leading to the photo-editing language model 120 combining the proximal coherent sentences into the current paragraph. In any case, photo-editing language model 120 selects the current workflow 304 based on paragraphs already detected from the sequence of action indications 302 of the current-interaction session and the training described in relation to FIG. 2.

The recommendation engine 118 is also configured to further train the photo-editing language model 120 to select workflows based on the received action indications 302. Referring back to the training, the photo-editing language model 120 can be trained as an LSTM-based model to detect workflows that are predicted for expert users (as opposed to beginner users). The photo-editing language model 120 is also trained to measure a difference, if any, between the predicted workflow and an actual workflow applied by the expert users. Based on this training, the photo-editing language model 120 predicts workflows in operation for beginner users. In this way, the recommendation engine 118 can provide recommendations for tools and actions to these beginner users to teach beginner users to carry out the workflow like expert users.

The photo-editing language model 120 can also be trained based on types of content depicted in the digital photographs. Accordingly, the photo-editing language model 120 can predict different workflows based on a type of content of a digital photograph, enabling recommendations to be made to carry out the predicted workflows. The photo-editing language model 120 can also be trained based on commercial and product goals associated (e.g., through metadata) with a digital photograph. To this extent, the photo-editing language model 120 can predict different workflows based on commercial and product goals associated with a digital photograph being edited. Furthermore, the photo-editing language model 120 can be configured (through received weighting information during training or during further training) to predict workflows that lead to presenting recommendations of targeted instrumentalities, e.g., advertised instrumentalities, new instrumentalities, and so forth.

In the illustrated example 300, the recommendation engine 118 is also illustrated with tool determination module 306. The tool determination module 306 represents functionality to identify tools of the photo-editing application 116 for recommendation based on the current workflow 304. By way of example, if the current workflow 304 corresponds to a photograph cropping workflow, the tool determination module 306 identifies the tools of the photo-editing application 116 that are useful for carrying out aspects of digital photograph cropping. The illustrated example 300 also includes workflow tools 308, which represent the tools identified by the tool determination module 306 for the current workflow 304. In one or more implementations, the tool determination module 306 also determines attribute values to recommend for carrying out the current workflow 304. These attribute values can be tied to the workflow tools 308, such as an amount of blur being tied to a slider that enables blur of depicted photographic content to be adjusted. In this example, the tool determination module 306 can preset such a slider to blur selected photographic content by a determined amount depending on the current workflow 304, e.g., to blur selected photographic content by an amount effective to remove skin blemishes for a blemish removal workflow. Accordingly, the workflow tools 308 thus also represents determined attribute values.

The illustrated example 300 also includes user interface configuration module 310 ("UI configuration module 310"), which represents functionality to configure one or more user interfaces associated with the photo-editing application to present the determined workflow tools 308. The UI configuration module 310 also represents functionality to present the determined workflow tools 308 in a way that recommends determined attribute values, e.g., such as setting instrumentalities for particular attributes according to the determined values. In one or more implementations, the UI configuration module 310 is incorporated as part of the photo-editing application 116. Alternately or in addition, the UI configuration module 310 may be part of an operating system of the client device 104. Regardless, the UI configuration module 310 represents functionality to configure the photo-editing application 116's user interface to present the workflow tools 308. Configured application user interface 312 (configured application UI 316) represents digital content comprising the photo-editing application 116's user interface configured with the recommended workflow tools 308, e.g., to present the workflow tools 308 to a user of the client device 104.

Figure 4:
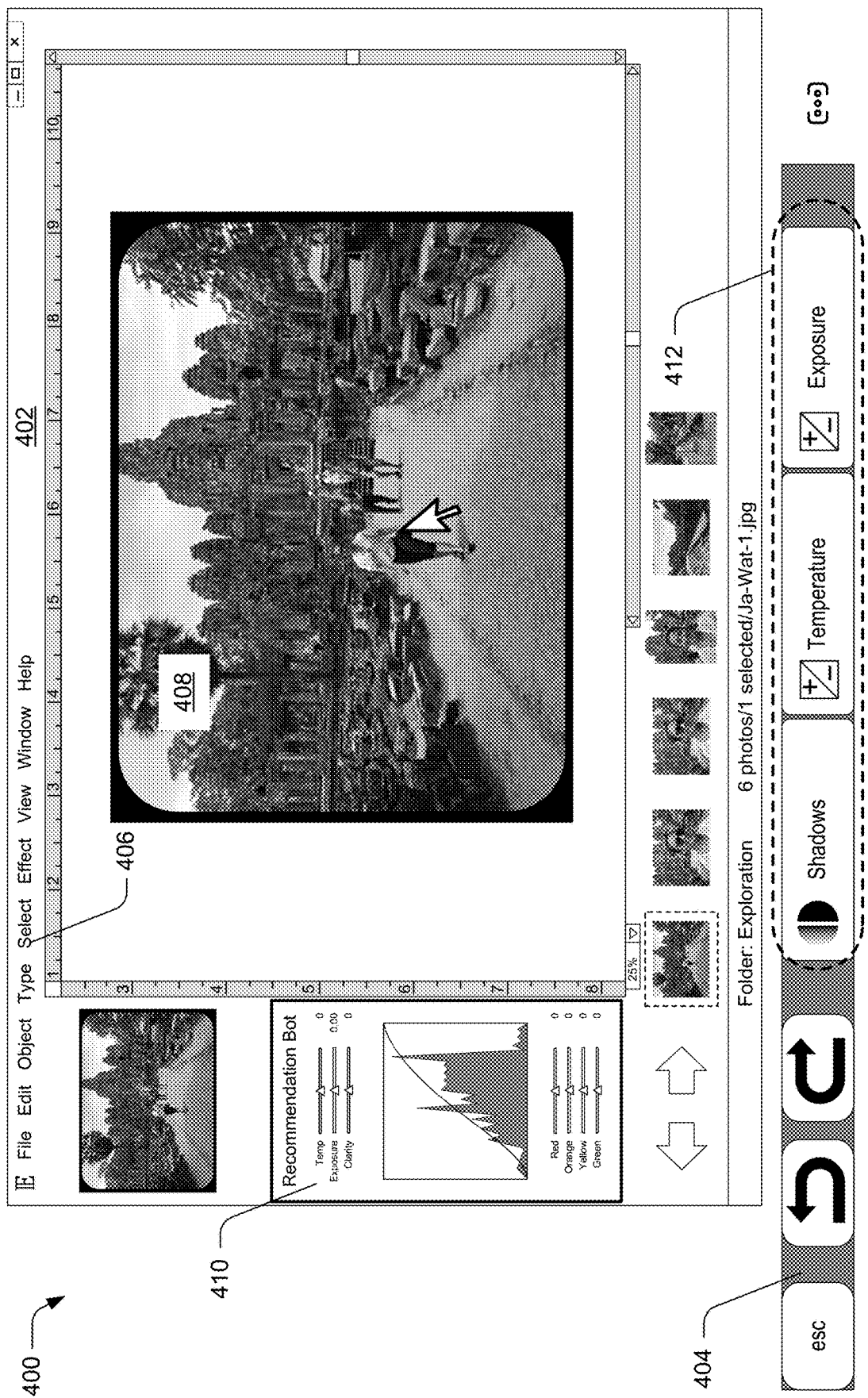
FIG. 4 depicts an example user interface configured to present recommendations to a user based on a predicted workflow.

FIG. 4 illustrates an example 400 of a user interface configured to present recommendations to a user based on a predicted workflow. The illustrated example 400 includes graphical user interface 402 and auxiliary graphical user interface 404. The graphical user interface 402 includes menu 406, which is depicted having options that are selectable to surface various tools for performing different photo-editing actions in relation to digital photograph 408. The graphical user interface 402 may be a user interface of the photo-editing application 116, for example.

The illustrated example 400 also includes tool recommendation 410, which is illustrated as a panel of the graphical user interface 402. Although illustrated as a panel, the tool recommendation 410 may be configured in a variety ways to recommend different combinations of tools without departing from the spirit or scope of the techniques described herein. For instance, tool recommendations may be presented as buttons, such as tool recommendation buttons 412 of the auxiliary graphical user interface 404. By way of example, recommendations can be presented as floating panels, overlays, and so on. In one or more implementations, the graphical user interface 402 and the auxiliary graphical user interface 404 are presented via different displays, such as via a display device of the client device 104 and via a display of an input device (e.g., keyboard, associated tablet, etc.) communicatively coupled to the client device 104. The graphical user interface 402 and the auxiliary graphical user interface 404 may be presented via other devices capable of display and communicative coupling with the client device 104 without departing from the spirit or scope of the described techniques. In some implementations, tool recommendations may be configured, in part, as audio content output for presentation to a user of the client device 104 via one or more speakers.

Nonetheless, in the illustrated example the tool recommendation 410 includes tool instrumentalities, which may be manipulated based on user input to edit some aspect of the digital photograph 408. The illustrated tool instrumentalities may be manipulated through received user inputs, for instance, to adjust different attributes of the digital photograph 408 and/or selected portions of the digital photograph 408. The graphical user interface 402 may support a variety of functionality to facilitate editing digital photographs, such as displaying thumbnails of multiple digital photographs that are part of an album, providing controls that enable a client device user to cycle through the different photographs of an album, a preview of edits applied to a photograph that is the focus of the edits (e.g., the digital photograph 408 in the illustrated example 400), an undo button, a redo button, and so forth.

Although the illustrated example depicts a tool recommendation being displayed in a graphical user interface, both the tool recommendations and user interface of the application may be configured differently without departing from the spirit or scope of the techniques described herein. By way of example, a user interface to an application may be voice-based, such that interactions between a user and the client device 104 occur by way of one or more microphones and one or more speakers. In such implementations, tool recommendations may be presented audibly. Alternately or additionally, the tool recommendations may be displayed via an augmented or virtual reality display device via which the digital photograph 408 can also be viewed. Indeed, the techniques described herein may be leveraged in connection with a variety of differently configured user interfaces.

Having discussed example details of the techniques for photo-editing application recommendations, consider now some example procedures to illustrate additional aspects of the techniques.

Example Procedures

This section describes example procedures for photo-editing application recommendations in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service provider system 102 of FIG. 1 that makes use of a language modeling system 106 with a language determination module 126 or one implemented as the example system 200 of FIG. 2, which also makes use of that module. A suitable device for performing the procedures may also be the client device 104 of FIG. 1 that makes use of a recommendation engine 118, which may be implemented as in the example 300 of FIG. 3.

FIG. 5 depicts an example procedure 500 in which a photo-editing language is used to determine a current workflow of a user in relation to editing a digital photograph and to recommend tools for carrying out the current workflow. Application usage data is obtained from existing users of a photo-editing application (block 502). In accordance with the principles discussed herein, the application usage data describes photo-editing actions performed by the existing users with the photo-editing application to edit digital photographs.

By way of example, the language determination module 126 obtains the application usage data 110 from the sources 108. In particular, the language determination module 126 collects the application usage data 110 from existing users of a photo-editing application for which a photo-editing language model 120 is being generated. In one or more implementations, the language determination module 126 collects the application usage data 110 from application users designated as "experts" and "beginners". The application usage data 110 describes the manner in which the sources 108's users interact with the photo-editing application. In some cases, the application usage data 110 comprises clickstream data to describe the interaction, though other types of data may be used in accordance with the described techniques.

A photo-editing language is determined based on the application usage data (block 504). In accordance with the principles discussed herein, the photo-editing language is determined by representing the photo-editing actions described by the application usage data as words and applying at least one natural language processing technique to the words. By way of example, the language determination module 126 determines a photo-editing language for a particular photo-editing application. The language determination module 126 does this by representing photo-editing actions described by the application usage data 110 as natural language words. Further, the language determination module 126 applies at least one natural language processing technique to these words, such as by using bidirectional long short-term memory (LSTM) to generate the photo-editing language model 120 as a recurrent neural network (RNN) and training this network.

Known workflows are determined based on the photo-editing language (block 506). In accordance with the principles discussed herein, a known workflow is a combination of the photo-editing actions commonly performed together to produce an edit in different digital photographs. By way of example, the language determination module 126 leverages its functionality to determine known workflows based on the photo-editing language determined at block 504. The language determination module 126 determines these known workflows as combinations of photo-editing actions commonly performed together to produce an edit in different digital photographs, such as actions performed to remove blemishes from the different digital photographs, crop the different digital photographs, apply filters to the different digital photographs to achieve a particular "look and feel", and so forth.

Application usage data is received that describes current photo-editing actions performed by a user of the photo-editing application in relation to at least one digital photograph (block 508). By way of example, the recommendation engine 118 receives the action indications 302. In this example, the action indications 302 describe current photo-editing actions performed by a user of the client device 104 with the photo-editing application 116 in relation to at least one digital photograph, such as the digital photograph 408.

A current workflow of the user, in relation to editing the at least one digital photograph, is predicted (block 510). In accordance with the principles discussed herein, the current workflow is predicted by identifying one of the known workflows based on the words of the photo-editing language that represent the current photo-editing actions. By way of example, the recommendation engine 118 predicts the current workflow 304 of the user of the client device 104 in relation to editing the digital photograph 408. The recommendation engine 118 predicts the current workflow 304 based on the words of the photo-editing language that represent the action indications 302 and using the photo-editing language model 120, which indicates semantic context of those words and provides the current workflow 304.

At least one recommended tool is output via a user interface of the photo-editing application (block 512). In accordance with the principles discussed herein, the at least one recommended tool is usable to carry out the photo-editing actions associated with the current workflow. By way of example, the tool determination module 306 determines the workflow tools 308 that are usable to carry out the photo-editing actions associated with the current workflow 304. Further, the UI configuration module 310 configures the graphic user interface 402 to include the tool recommendation 410 having the workflow tools 308.

Figure 6:
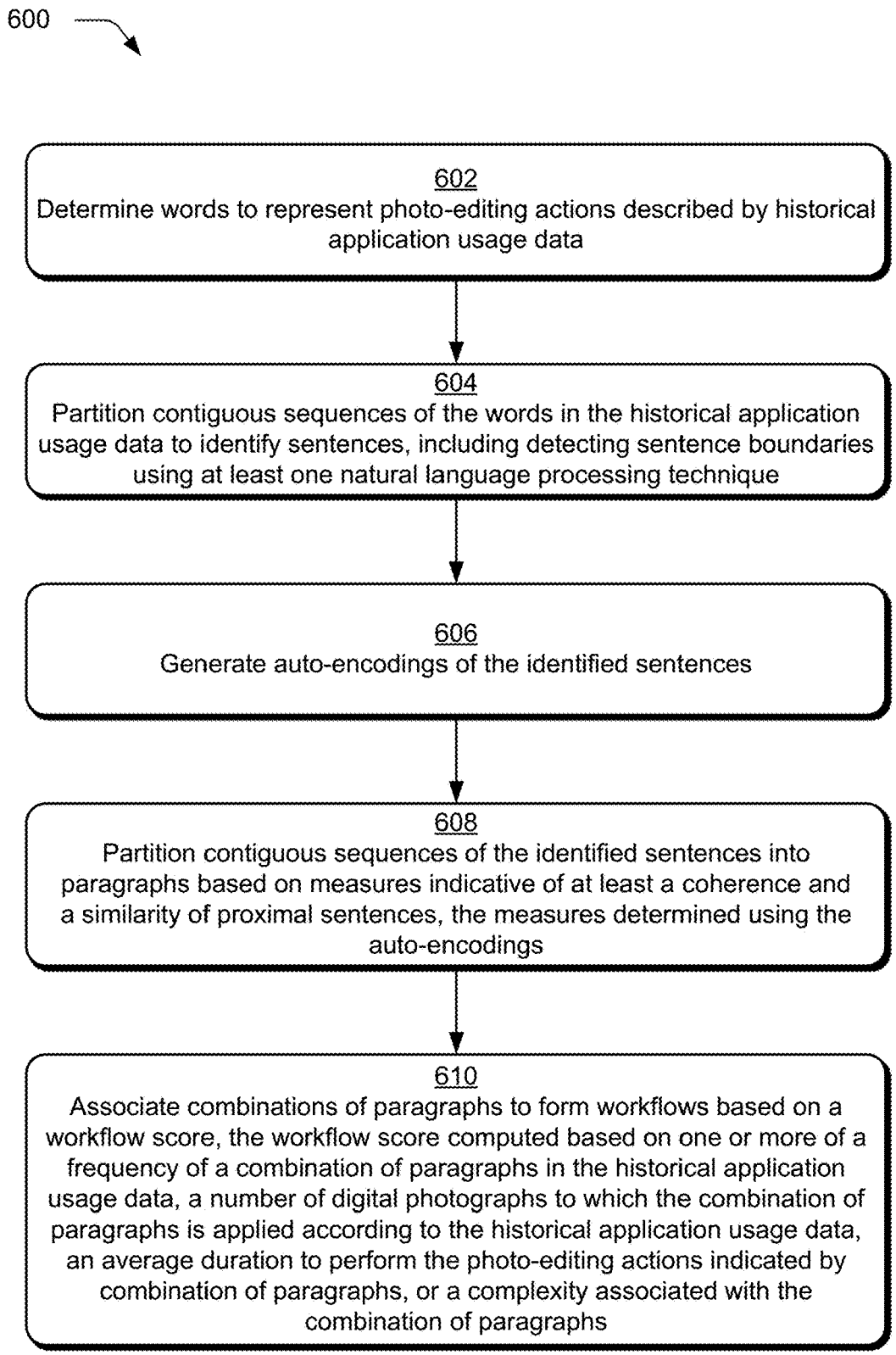
FIG. 6 depicts a procedure in an example implementation in which a photo-editing language is determined based on historical application usage data.

FIG. 6 depicts an example procedure 600 in which a photo-editing language is determined based on historical application usage data. Words are determined for representing photo-editing actions described by historical application usage data (block 602). By way of example, the usage data conversion module 202 determines words for representing photo-editing actions described by the application usage data 110 collected from the sources 108.

Contiguous sequences of the words in the historical application usage data are partitioned to identify sentences (block 604). In accordance with the principles discussed herein, the sentences are identified, in part, by detecting sentence boundaries between contiguous words using one or more natural language processing technique. By way of example, the photo-editing sentence module 204 partitions contiguous sequences of the words that represent the application usage data 110 into sentences. The photo-editing sentence module 204 partitions these sequences of words using bidirectional long short-term memory (LSTM) in connection with generating the photo-editing language model 120 as a recurrent neural network (RNN) and training this network. Auto-encodings of the identified sentences are generated (block 606). By way of example, the photo-editing sentence module 204 generates auto-encodings of the sentences produced at block 604 using the photo-editing language model 120, such that these auto-encodings correspond to output of the photo-editing language model 120.

Contiguous sequences of the sentences are partitioned into paragraphs (block 608). In accordance with the principles discussed herein, this partitioning is based, in part, on measures indicative of at least a coherence score and similarity of proximal sentences computed using the auto-encodings. By way of example, the photo-editing paragraph module 206 partitions contiguous sequences of the sentences produced at block 604 into paragraphs. The photo-editing paragraph module 206 partitions these sequences of sentences into paragraphs, at least in part, by computing a measure of coherence and a measure of similarity of the sentences, as discussed in detail above.

Combinations of the paragraphs are associated to form workflows (block 610). In accordance with the principles discussed herein, the combinations of paragraphs are associated based on a workflow score. This workflow score is computed for combined paragraphs based on one or more of a frequency of the combined paragraphs in the historical application usage data, a number of digital photographs to which the combined paragraphs is applied according to the historical application usage data, an average time duration to perform the photo-editing actions indicated by the combined paragraphs, or a complexity associated with the combined paragraphs. By way of example, the photo-editing workflow module 208 forms workflows by associating combinations of the paragraphs determined at block 608. The photo-editing workflow module 208 associates these paragraphs based on a workflow score that considers one or more of the above-noted factors. The photo-editing workflow module 208 also learns weights to associate with these factors as part of training the photo-editing language model 120 based on the occurrence of the workflows as indicated by the application usage data 110.

Having described example procedures in accordance with one or more implementations, consider now an example system and device that can be utilized to implement the various techniques described herein.

Example System and Device

Figure 7:
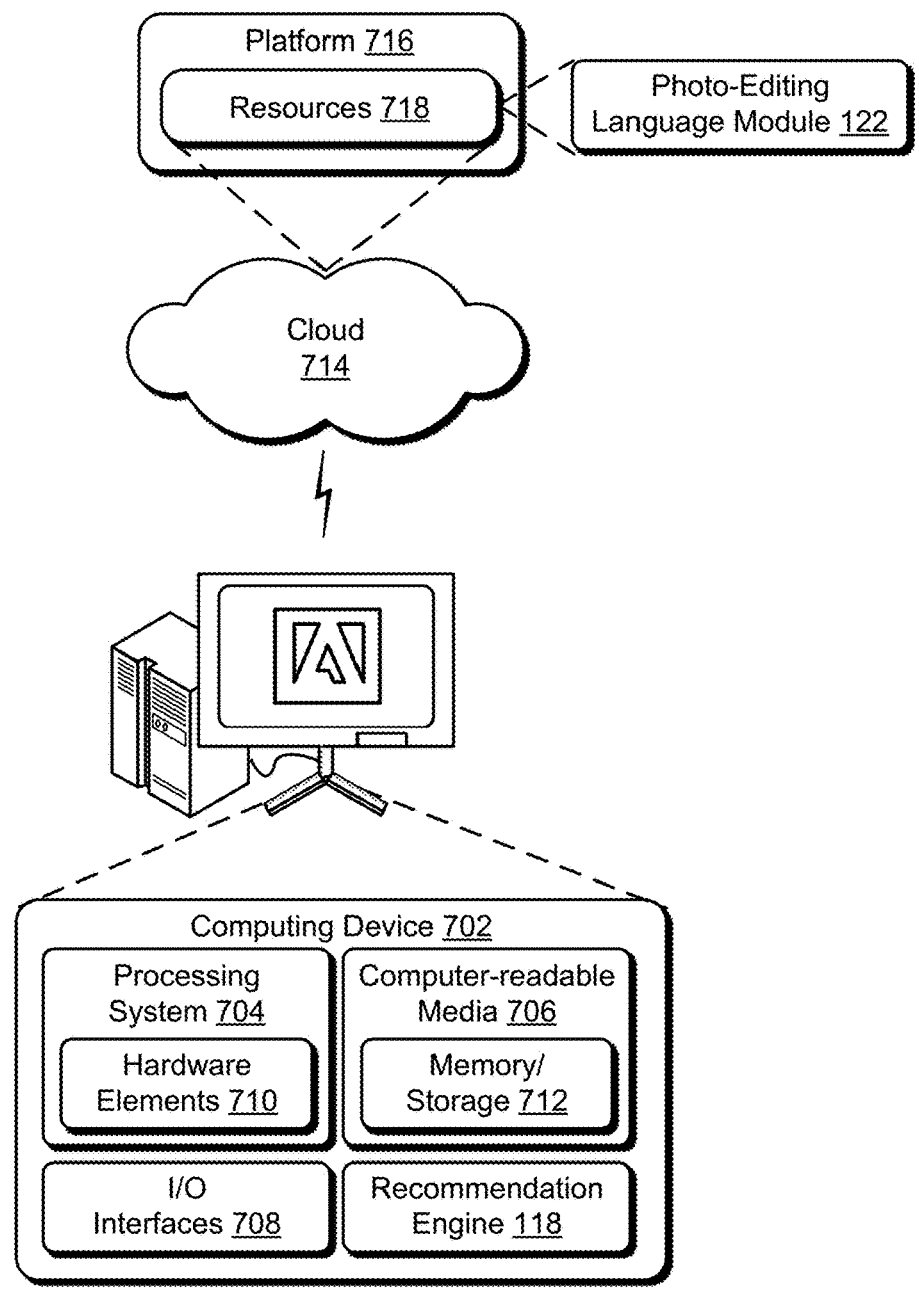
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the recommendation engine 118 and the photo-editing language module 122. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to automatically provide recommendations for carrying out workflows in connection with editing digital photographs, a method implemented by at least one computing device, the method comprising:

obtaining, by the at least one computing device, application usage data that describes photo-editing actions performed by existing users with a photo-editing application;

determining, by the at least one computing device, a photo-editing language by representing the photo-editing actions described by the application usage data as a sequence of words arranged semantically in an order that the photo-editing actions are performed and applying at least one natural language processing technique to the words, including partitioning contiguous sequences of semantically arranged words into sentences and contiguous sequences of the sentences into paragraphs of the photo-editing language;

determining, by the at least one computing device, a plurality of known workflows based on the photo-editing language;

receiving, by the at least one computing device, additional application usage data that describes current photo-editing actions performed by a user of the photo-editing application in relation to at least one digital photograph;

predicting, by the at least one computing device, a current workflow in relation to editing the at least one digital photograph, the current workflow predicted by identifying one of the known workflows based on semantically similar words of the photo-editing language that represent the current photo-editing actions; and outputting, by the at least one computing device, at least one recommended tool via a user interface of the photo-editing application based on the current workflow.

2. A method as described in claim 1, wherein a known workflow comprises a combination of the photo-editing actions commonly performed together to produce an edit in different digital photographs.

3. A method as described in claim 1, wherein the at least one recommended tool is usable to carry out the photo-editing actions associated with the current workflow.

4. A method as described in claim 1, wherein the at least one natural language processing technique includes modelling the photo-editing language using a recurrent neural network (RNN) with long short-term memory (LSTM).

5. A method as described in claim 1, wherein the known workflows are determined as combinations of the paragraphs of the photo-editing language.

6. A method as described in claim 1, wherein the contiguous sequences of semantically arranged words are partitioned, in part, by generating an estimated likelihood that an n-gram centered around a current word corresponds to a sequence of the photo-editing actions performed together to carry out a photo-editing operation.

7. A method as described in claim 1, further comprising:
generating auto-encodings of the sentences;
measuring a coherence of a contiguous sequence of the sentences based on the auto-encodings;
measuring a similarity of interpolated sentences and the sentences present between two given sentences of the contiguous sequence, the interpolated sentences generated based on the two given sentences and according to one or more sentence interpolation techniques; and
partitioning the contiguous sequences of sentences into the paragraphs based on the coherence and the similarity.

8. A method as described in claim 5, further comprising forming the known workflows by associating combinations of the paragraphs according to a workflow score.

9. A method as described in claim 8, further comprising computing the workflow score for a combination of the paragraphs based on one or more of:
a frequency of the combination of paragraphs in the application usage data;
a number of digital photographs to which the combination of paragraphs is applied according to the application usage data;
an average duration to perform the photo-editing actions indicated by the combination of paragraphs; and
a complexity associated with the combination of paragraphs.

10. A method as described in claim 1, further comprising predicting the current workflow in real-time as the additional application usage data is received, including:
partitioning contiguous sequences of semantically arranged words that represent the additional application usage data into additional sentences of the photo-editing language;
partitioning contiguous sequences of the additional sentences into additional paragraphs of the photo-editing language;
identifying the known workflows that include the additional paragraphs previously determined according to the partitioning;
computing a workflow score for identified workflows; and
selecting the current workflow from the identified workflows based on the workflow score.

11. A method as described in claim 1, further comprising:
updating the photo-editing language based on the additional application usage data; and
predicting current workflows in relation to editing future digital photographs based on the updated photo-editing language.

12. A method as described in claim 1, further comprising:
predicting a different current workflow in real-time as the additional application usage data is received; and
updating the user interface to output at least one different recommended tool based on the different current workflow, the at least one different recommended tool usable to carry out the photo-editing actions associated with the different current workflow.

13. A system implemented in a digital medium environment to automatically provide recommendations for carrying out workflows in connection with editing digital photographs, the system comprising:
at least one processor; and
memory having stored thereon computer-readable instructions that are executable by the at least one processor to perform operations comprising:
obtaining application usage data that describes photo-editing actions performed by users of a photo-editing application;
generating digital content as a photo-editing language model by applying one or more natural language processing techniques to words selected to represent the photo-editing actions as a sequence of the words semantically arranged in an order that the photo-editing actions are performed, the one or more natural language processing techniques including partitioning contiguous sequences of semantically arranged words into sentences and contiguous sequences of the sentences into paragraphs; and
deploying the photo-editing language model for incorporation with the photo-editing application, the photo-editing language model used by the photo-editing application to recommend at least one tool based on additional application usage data received as a digital photograph is being edited.

14. A system as described in claim 13, wherein the photo-editing language model comprises a recurrent neural network (RNN).

15. A system as described in claim 13, wherein the photo-editing language model comprises an RNN with long short-term memory (LSTM).

16. A system as described in claim 13, wherein the operations further include obtaining additional information about digital photographs edited via the photo-editing actions performed by the users, the photo-editing language model being further generated based on the additional information.

17. A system as described in claim 16, wherein the additional information includes at least one of:
an indication of whether the users correspond to expert or beginner photo-editors;
an indication of a digital photograph in relation to which the photo-editing actions are performed;
a portion of a user interface via which the photo-editing actions are performed;

devices used to perform the photo-editing actions; or the digital photographs.

18. In a digital medium environment to automatically provide recommendations for carrying out workflows in connection with editing digital photographs, a method implemented by at least one computing device, the method comprising:

obtaining, by the at least one computing device, digital content comprising a photo-editing language model trained to predict a current workflow in connection with editing digital photographs via a photo-editing application, the photo-editing language model trained by representing photo-editing actions in an order that the photo-editing actions are performed with the photo-editing application as a sequence of semantically arranged words and applying at least one natural language processing technique, including partitioning contiguous sequences of semantically arranged words into sentences and contiguous sequences of the sentences into paragraphs of a photo-editing language;

providing, by the at least one computing device and to the photo-editing language model, data indicative of a stream of photo-editing actions performed in an order by a user of the photo-editing application in connection with editing a digital photograph;

receiving, by the at least one computing device, a prediction of the current workflow as output from the photo-editing language model, the photo-editing language model outputting the prediction based, in part, on the semantically arranged words of the photo-editing language that represent the photo-editing actions of the stream; and presenting, by the at least one computing device, a recommendation for at least one tool of the photo-editing application based on the current workflow.

19. A method as described in claim 18, wherein the at least one computing device comprises a client device and the recommendation is presented via an auxiliary display device associated with the client device.

20. A method as described in claim 19, wherein the photo-editing language model is obtained from a service provider configured to train the photo-editing language model using application usage data collected from existing users of the photo-editing application.

* * * * *